(12) United States Patent
Porto et al.

(10) Patent No.: US 12,434,535 B2
(45) Date of Patent: Oct. 7, 2025

(54) METHOD FOR CONTROLLING AN AIR-FLOW THERMAL CONDITIONING UNIT

(71) Applicant: Valeo Systemes Thermiques, Le Mesnil Saint-Denis (FR)

(72) Inventors: Muriel Porto, Le Mesnil Saint Denis (FR); Wissem Nouainia, Le Mesnil Saint-Denis (FR); Jin-Ming Liu, Le Mesnil Saint-Denis (FR); Régis Beauvis, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 760 days.

(21) Appl. No.: 17/619,454

(22) PCT Filed: Jun. 16, 2020

(86) PCT No.: PCT/FR2020/051035
§ 371 (c)(1),
(2) Date: Dec. 15, 2021

(87) PCT Pub. No.: WO2020/254756
PCT Pub. Date: Dec. 24, 2020

(65) Prior Publication Data
US 2022/0402330 A1  Dec. 22, 2022

(30) Foreign Application Priority Data
Jun. 19, 2019 (FR) ........................................ 1906588

(51) Int. Cl.
*B60H 1/00* (2006.01)
*B60H 1/32* (2006.01)

(52) U.S. Cl.
CPC ..... *B60H 1/00785* (2013.01); *B60H 1/00921* (2013.01); *B60H 2001/00928* (2013.01); *B60H 2001/3245* (2013.01)

(58) Field of Classification Search
CPC ............ B60H 1/00785; B60H 1/00792; B60H 1/3207; F25B 39/02
See application file for complete search history.

(56) References Cited

U.S. PATENT DOCUMENTS

| 5,301,515 A | 4/1994 | Iritani et al. |
| 6,052,998 A * | 4/2000 | Dage ................. B60H 1/00821 62/282 |

(Continued)

FOREIGN PATENT DOCUMENTS

| CN | 104470741 A | 3/2015 |
| CN | 105102249 A | 11/2015 |

(Continued)

OTHER PUBLICATIONS

International Search Report and Written Opinion in corresponding International Application No. PCT/FR2020/051035, mailed Oct. 19, 2020 (12 pages).

(Continued)

*Primary Examiner* — Jianying C Atkisson
*Assistant Examiner* — For K Ling
(74) *Attorney, Agent, or Firm* — Osha Bergman Watanabe & Burton LLP

(57) ABSTRACT

The invention relates to a method for controlling a thermal conditioning circuit (100) for thermally conditioning an air flow (1), notably intended for a motor vehicle interior (2), the circuit comprising a heat exchanger (4) configured to have a refrigerant pass through it and exchange heat with the air flow (1), the heat exchanger (4) being configured to operate selectively in at least: —a mode known as cooling (Continued)

Figure 1:
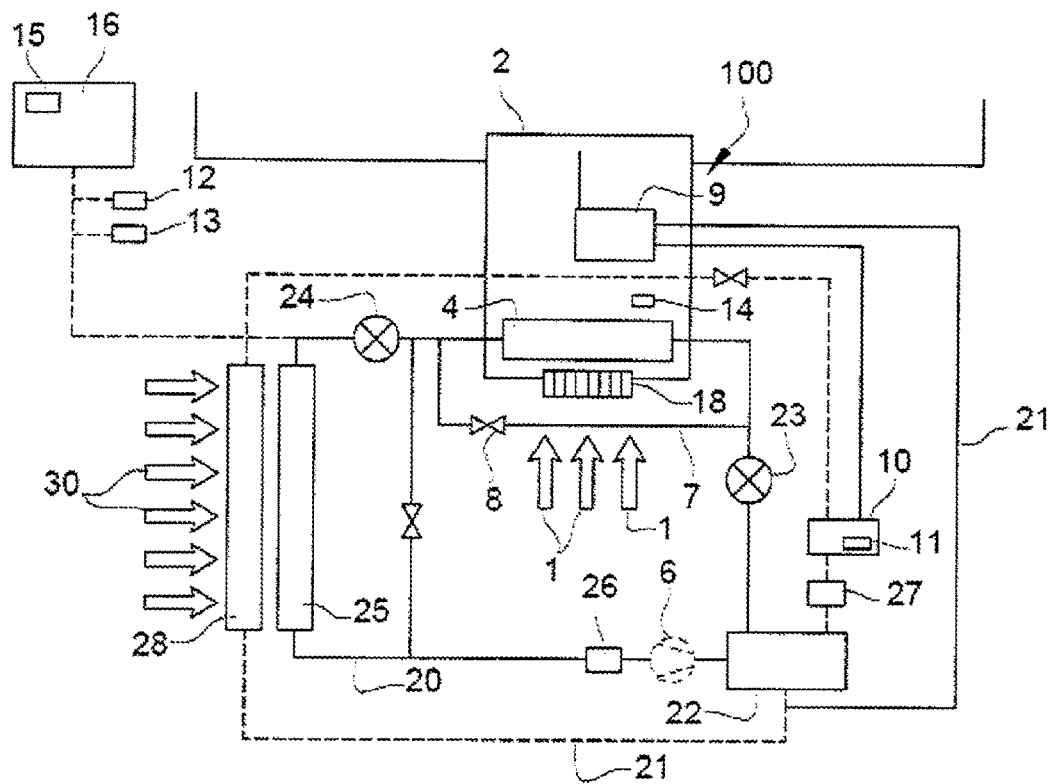

mode, —a mode known as heating mode, the method comprising the steps of: —evaluating a level of humidity in a region in contact with an exterior surface (5) of the heat exchanger (4), —detecting an instruction to switch from cooling mode to heating mode, —if the evaluated level of humidity is below a predetermined first threshold (s1), allowing refrigerant to circulate through the exchanger (4) in response to the instruction to switch to heating mode, —if the level of humidity is above a predetermined second threshold (s2), preventing the refrigerant from circulating through the exchanger (4) for a first predetermined length of time (D1), so as to delay the switch to heating mode.

9 Claims, 5 Drawing Sheets

(56) References Cited

U.S. PATENT DOCUMENTS

| | | | | |
|---|---|---|---|---|
| 2003/0230094 A1* | 12/2003 | Takano | .............. | B60H 1/00785 62/80 |
| 2004/0182094 A1* | 9/2004 | Menager | ............ | B60H 1/00785 165/230 |
| 2005/0034473 A1 | 2/2005 | Casar et al. | | |
| 2007/0221371 A1* | 9/2007 | Ichikawa | ............ | B60H 1/00914 165/204 |
| 2011/0232310 A1* | 9/2011 | Kawashima | ....... | B60H 1/00785 62/176.1 |
| 2014/0087644 A1* | 3/2014 | Watanabe | .......... | B60H 1/00785 454/75 |
| 2015/0233627 A1 | 8/2015 | Ragazzi | | |
| 2016/0114651 A1* | 4/2016 | Mayer | ................ | B60H 1/00785 62/93 |
| 2018/0056941 A1* | 3/2018 | Won | ........................ | B60S 1/026 |

FOREIGN PATENT DOCUMENTS

| | | |
|---|---|---|
| CN | 105452027 A | 3/2016 |
| CN | 105960345 A | 9/2016 |
| DE | 3907201 A1 | 9/1990 |
| EP | 2878468 A1 | 6/2015 |
| EP | 3031641 A1 | 6/2016 |
| EP | 2933586 B1 | 9/2018 |

OTHER PUBLICATIONS

Office Action issued in counterpart Chinese Patent Application No. CN 202080045301.X issued Dec. 9, 2023 (15 pages).

* cited by examiner

Fig. 3
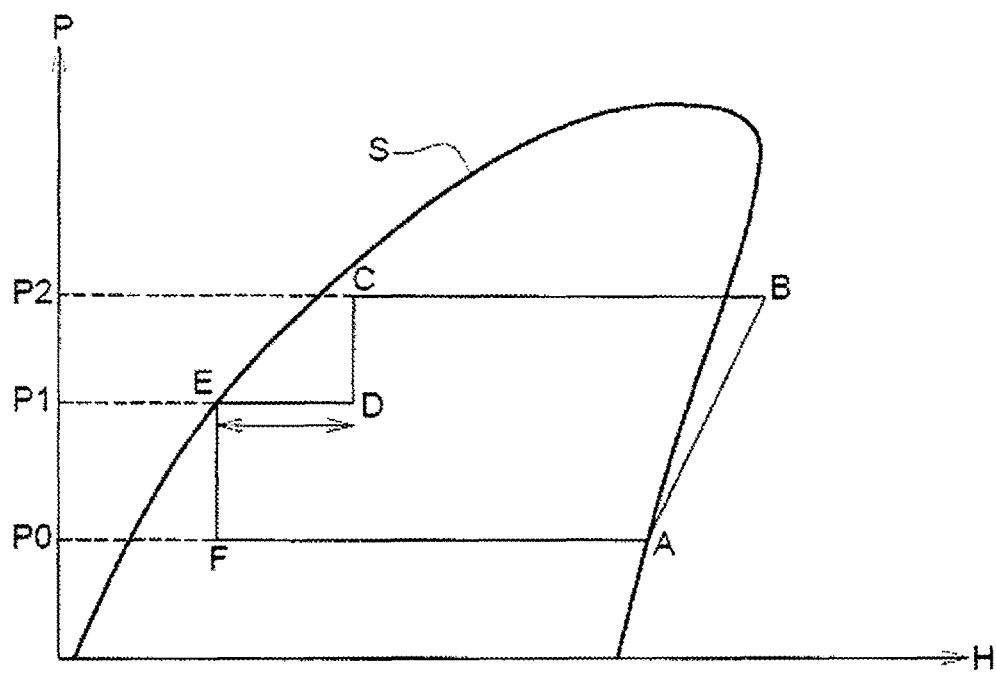
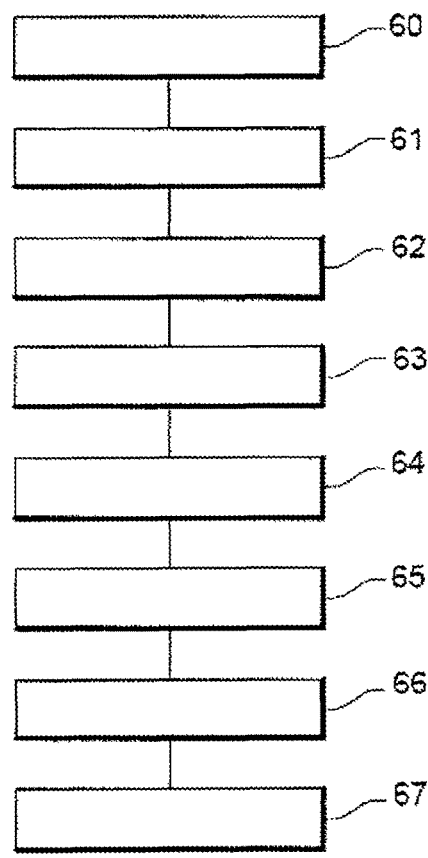
Fig. 4

METHOD FOR CONTROLLING AN AIR-FLOW THERMAL CONDITIONING UNIT

The present invention relates to the field of thermal conditioning circuits for thermally conditioning an air flow, in particular for a motor vehicle. Such systems make it possible in particular to control the temperature inside the vehicle passenger compartment.

In purely electrically powered vehicles, the heating for the passenger compartment uses some of the energy contained in the batteries, which tends to reduce their range, especially in cold weather. In order to minimize the reduction in range in cold weather, it is known practice to employ a thermal conditioning circuit capable of operating in "heat pump" mode. To this end, a refrigerant undergoes a thermodynamic cycle during which the refrigerant is first compressed. The high-pressure refrigerant undergoes condensation, releasing a quantity of heat which makes it possible to heat, for example, the passenger compartment of the vehicle. After condensation, the refrigerant is expanded and undergoes vaporization in a heat exchanger in contact with the air outside the vehicle. The refrigerant vaporizes, taking the heat necessary for vaporization from the external air flow. This part of the thermodynamic cycle therefore does not consume electrical energy. This technology is therefore particularly advantageous for electric vehicles, since it makes it possible to limit the electricity consumption devoted to heating the passenger compartment. A larger share of the battery capacity can therefore be devoted to the propulsion of the vehicle, improving the range of the vehicle.

The heating of the passenger compartment can for example be indirect, in other words the heat from condensation of the refrigerant makes it possible, in a two-fluid exchanger, to heat a heat transfer fluid, such as a heat transfer liquid. The heat transfer liquid then circulates through a heat exchanger through which a flow of air intended for the passenger compartment passes, thus heating the passenger compartment. When it is necessary to cool the air flow intended for the passenger compartment, the refrigerant is expanded in another heat exchanger in thermal contact with the air flow intended to supply the passenger compartment. This exchanger thus operates as an evaporator, cooling the passenger compartment by taking the heat for vaporization of the refrigerant from the air flow intended for the passenger compartment.

It is known practice, for example from the applicant's patent EP 2933586 B1, to heat the air partially by condensing some of the refrigerant in this heat exchanger during operation in heat pump mode. In this case, this heat exchanger assists the two-fluid exchanger in absorbing energy from the refrigerant, which improves the performance of the heating in the passenger compartment. The heat exchanger operates during this phase as a condenser.

In other words, the same heat exchanger can function as an evaporator in some operating phases and as a condenser in other operating phases. During the operating phases in evaporator mode, the air in contact with the heat exchanger is cooled. The water vapor present in the air can thus condense on contact with the exchanger, the surface of which may be at a temperature below the dew point of the air. The surface of the heat exchanger thus tends to gradually become covered with water in liquid form during a phase of operation in cooling mode. If a heating phase is subsequently triggered while water in liquid form is present on the heat exchanger, this water tends to vaporize and to be taken up by the air flow intended for the passenger compartment. If the windows of the vehicle are cold, the water vapor taken up will condense on the windows and mist them up. When there is a large amount of water on the evaporator, this mist can seriously impair visibility and become a driving hazard. It is therefore necessary to manage the transitions between the operating modes in a particular way in order to avoid misting, in particular on the windshield.

To this end, the invention provides a control method for controlling a thermal conditioning circuit for thermally conditioning an air flow, in particular intended for a passenger compartment of a motor vehicle, the circuit comprising a heat exchanger configured to have a refrigerant pass through it and to exchange heat with the air flow, the heat exchanger being configured to operate selectively in at least:

a mode referred to as cooling mode in which the air flow is cooled, a mode referred to as heating mode in which the air flow is heated, the method comprising the following steps:

evaluating a moisture level in a region in contact with an outer surface of the heat exchanger, detecting an instruction to switch from cooling mode to heating mode, if the evaluated moisture level is below a first predetermined threshold, allowing refrigerant to circulate through the heat exchanger in response to the instruction to switch to heating mode, if the evaluated moisture level is above a second predetermined threshold, preventing the refrigerant from circulating through the heat exchanger for a first predetermined period of time so as to delay the switch to heating mode.

When the moisture level evaluated on the heat exchanger is low enough to avoid the risk of misting, switching of the heat exchanger to heating mode is authorized upon receipt of the instruction. If the evaluated moisture level is too high, i.e. the surface of the heat exchanger has too many water droplets, the switch to heating mode is delayed with respect to receipt of the instruction to switch to heating mode. In other words, the instruction to switch to heating mode is not applied immediately, but after a time delay. The delay thus introduced can be used to reduce the moisture level of the heat exchanger, in particular by ensuring that an air flow passes through the exchanger in order to allow the moisture present to evaporate and thus the exchanger surface to dry out. It is thus possible to obtain conditions in which switching to heating mode will not pose a problem.

According to one embodiment, the control method comprises the following step:

if the evaluated moisture level is between the first predetermined threshold and the second predetermined threshold, preventing the refrigerant from passing into the heat exchanger for a second predetermined period of time so as to delay the switch to heating mode.

The time delay for which the switch to heating mode is prevented can thus be adjusted to the moisture level evaluated on the heat exchanger. The principle is that the higher the moisture level, the longer it is necessary to wait before allowing the switch to heating mode.

According to one embodiment of the method, the thermal conditioning circuit comprises a compression device configured to increase the pressure of the refrigerant.

For example, the compression device is an electrically driven compressor.

According to an exemplary implementation of the method, circulation of the refrigerant through the heat exchanger is prevented by keeping the compression device shut down.

When the compressor is shut down, circulation of refrigerant through the thermal conditioning circuit is negligible, and it is considered that there is thus no circulation of refrigerant through the heat exchanger.

According to another exemplary implementation of the method, circulation of the refrigerant through the heat exchanger is prevented by opening a bypass line allowing the refrigerant to bypass the heat exchanger.

Another possibility for preventing circulation of the refrigerant through the heat exchanger is to open a line of the circuit that bypasses the heat exchanger. The refrigerant then passes through the bypass line rather than the heat exchanger, which is tantamount to preventing circulation through the heat exchanger.

Advantageously, the bypass line includes a shut-off valve configured to prevent the circulation of fluid through the bypass line.

The shut-off valve is used to prevent the refrigerant from bypassing the heat exchanger when the heat exchanger can operate normally.

According to one embodiment of the control method, the circuit comprises an additional heating device configured to heat the air flow, the method comprising the following step:
  during the step of preventing the refrigerant from passing into the heat exchanger, activating the additional heating device in order to heat the air flow.

As switching the heat exchanger to heating mode is prevented in this phase of operation, another heating device is activated instead. This additional heating device ensures the desired heating power.

According to one exemplary implementation of the method, the additional heating device is activated for the whole duration of the step of preventing the refrigerant from passing into the heat exchanger.

According to another exemplary implementation of the method, the additional heating device is activated for some of the duration of the step of preventing the refrigerant from passing into the heat exchanger.

According to one embodiment, the additional heating device is arranged, according to the direction of circulation of the air flow, downstream of the heat exchanger.

This arrangement prevents the air flow intended for the passenger compartment of the vehicle from picking up the moisture contained on the surface of the heat exchanger.

According to one exemplary implementation of the method, the first predetermined period of prevention of circulation of the refrigerant through the heat exchanger is between 8 and 12 minutes, preferably between 9 and 11 minutes.

These ranges of values ensure mist-free operation when the heat exchanger switches to heating mode when a high moisture level has been evaluated.

According to one exemplary implementation of the method, the second predetermined period of prevention of circulation of the refrigerant through the heat exchanger is between 3 and 5 minutes, preferably equal to 4 minutes.

As above, these ranges of values ensure mist-free operation when the heat exchanger switches to heating mode when an intermediate moisture level has been evaluated.

According to one embodiment, the additional heating device includes an electrical resistor configured to exchange heat with the air flow.

An electrical resistor ensures high thermal power and has low thermal inertia.

According to one embodiment, the additional heating device comprises an electrical resistor configured to heat a heat transfer fluid circulating through a heat exchanger exchanging heat with the air flow.

Additional heating with heat transfer fluid is easily controllable, due to the thermal inertia of the heat transfer fluid. Preferably, the heat transfer fluid is a heat transfer liquid.

According to another embodiment, the additional heating device comprises a burner configured to burn fuel.

According to one exemplary implementation, the control method comprises the following step:
  during the step of activating the additional heating device, ensuring a minimum value for the flow rate of the air flow in thermal contact with the heat exchanger.

Ensuring a minimum air flow rate speeds up the evaporation of water from the surface of the heat exchanger. In other words, the air passing through the heat exchanger dries the latter. The air flow rate is chosen such that the evaporation is slow enough not to saturate the air passing through the exchanger, so as to avoid misting. Moreover, the minimum flow rate is chosen so as not to be perceptible by the user when the user has decided not to activate the air conditioning system of the vehicle.

According to one exemplary implementation, the control method comprises the following step:
  during the step of activating the additional heating device, increasing the flow rate of the air flow in thermal contact with the heat exchanger.

The increase in the flow rate of air in contact with the heat exchanger speeds up the evaporation of water from the surface of the heat exchanger. The increase in the flow rate of air is chosen such that evaporation is slow enough that there is no risk of misting. In this optional step, the flow rate of air is increased even if the minimum air flow rate criterion is already met.

For example, the increase in the flow rate of the air flow is obtained by increasing a rotational speed of a motor-fan unit.

According to one feature of the invention, the control method comprises the following step:
  determining a period of time for which the heat exchanger operates in cooling mode,
  if the operating time in cooling mode is greater than a third predetermined period of time, incrementing the moisture level evaluated on the heat exchanger.

The period of time for which the heat exchanger operates in cooling mode, that is to say as an evaporator, makes it possible to evaluate the amount of water that forms in the vicinity of the heat exchanger. Thus, it is possible to evaluate the moisture level in a region in contact with an outer surface of the heat exchanger. The heat exchanger "cooling" mode may correspond to several different operating modes of the thermal conditioning circuit. To be specific, the vehicle passenger compartment air "conditioning" mode and "dehumidification" mode both cause the heat exchanger to operate in "cooling" mode.

According to an exemplary implementation of the method, the moisture level evaluated on the heat exchanger is evaluated on a discrete scale comprising two levels.

A two-level scale makes it possible to differentiate between a "dry" state and a "wet" state of the heat exchanger. This solution is simple to implement.

According to an alternative implementation of the method, the moisture level evaluated on the heat exchanger is evaluated on a discrete scale comprising three levels.

A three-level scale makes it possible to differentiate between a "dry" state, a "partially wet" state and a "completely wet" state of the heat exchanger. This allows a good compromise between performance and difficulty of implementation.

According to another alternative implementation of the method, the moisture level evaluated on the heat exchanger is evaluated on a discrete scale comprising N levels, N being an integer strictly greater than 3.

An N-level scale, with N strictly greater than three, makes it possible to differentiate between a "dry" state, a "completely wet" state and several "partially wet" states defining increasing moisture levels of the heat exchanger. Such an alternative can allow finer modeling of the phenomena of condensation and evaporation of water on the heat exchanger.

According to an exemplary implementation of the method, the third predetermined period of time after which the moisture level evaluated on the heat exchanger is incremented is a constant value.

This modeling is the simplest to implement.

According to another exemplary implementation of the method, the third predetermined period of time after which the moisture level evaluated on the heat exchanger is incremented is determined on the basis of a value of a flow rate of air in contact with the heat exchanger.

The accuracy of the modeling of the phenomena of condensation and evaporation of water on the heat exchanger can thus be improved.

According to one embodiment, the third predetermined period of time after which the moisture level evaluated on the heat exchanger is incremented is determined on the basis of a value of the ambient temperature.

Likewise, taking into account the ambient temperature improves the accuracy of the modeling.

According to one embodiment, the ambient temperature is measured by a temperature sensor.

According to one embodiment, the third predetermined period of time after which the moisture level evaluated on the heat exchanger is incremented is determined on the basis of an ambient humidity level.

As above, taking into account the humidity in the ambient air improves the accuracy of the modeling.

According to one embodiment, the ambient humidity level is measured by a humidity sensor.

According to one embodiment, the third predetermined period of time after which the moisture level evaluated on the heat exchanger is incremented is determined on the basis of a value of the temperature of the air flow downstream of the heat exchanger.

Again, taking into account the temperature of the air flow blown by the heat exchanger improves the accuracy of the modeling. The parameters listed may be used independently or in combination.

According to one embodiment, the temperature of the air flow downstream of the heat exchanger is measured by a temperature sensor.

According to one feature of the invention, the control method comprises the following step:
 determining a period of time for which the heat exchanger operates in a mode other than cooling mode,
 if the operating time in a mode other than cooling mode is greater than a fourth predetermined period of time, decrementing the moisture level evaluated on the heat exchanger.

A mode other than "cooling" mode means "heating" mode or "inactive" mode. In "heating" mode, the heat exchanger exchanges heat with the air in contact with its surface so as to heat the air. In "inactive" mode, the exchanger does not exchange heat with the air in contact with its surface. This mode can for example be triggered by the driver of the vehicle when he does not wish to use the vehicle's air conditioning circuit.

According to one embodiment, the fourth predetermined period of time after which the moisture level evaluated on the heat exchanger is decremented is determined on the basis of a value of a flow rate of air in contact with the heat exchanger.

The value of the flow rate of air in contact with the exchanger is involved in the physical phenomenon of evaporation of the water droplets present on the surface of the exchanger. Taking this parameter into account makes it possible to improve the modeling carried out by the method.

According to one embodiment, the fourth predetermined period of time after which the moisture level evaluated on the heat exchanger is decremented is determined on the basis of a value of the ambient temperature.

According to one embodiment, the fourth predetermined period of time after which the moisture level evaluated on the heat exchanger is decremented is determined on the basis of an ambient humidity level.

According to one embodiment, the fourth predetermined period of time after which the moisture level evaluated on the heat exchanger is decremented is determined on the basis of a value of the temperature of the air flow upstream of the heat exchanger.

As above, taking into account the various physical values involved in the phenomenon of evaporation of the water droplets present on the surface of the exchanger makes it possible to improve the accuracy of the method.

According to one feature of the invention, the control method comprises the following step:
 when the vehicle is switched off, storing the moisture level evaluated on the heat exchanger.

According to one embodiment, the control method comprises the following step:
 when the vehicle is switched off, writing the moisture level evaluated on the heat exchanger in a permanent memory of an electronic control unit.

The stored value can thus be read again when the vehicle is started up again after a period of inactivity.

According to one embodiment, the control method comprises the following step:
 when the vehicle is started up, determining the evaluated moisture level stored when the vehicle was switched off.

According to one embodiment, the control method comprises the following step:
 when the vehicle is started up, determining a time for which the vehicle was shut down.

According to one exemplary implementation of the invention, the control method comprises the following step:
 if the shutdown time is greater than a predetermined shutdown time, assigning a zero value to the moisture level evaluated on the heat exchanger.

If the shutdown is long enough, it is considered that all the water that was present on the heat exchanger when the vehicle was shut down has had time to evaporate while the vehicle was shut down. The heat exchanger is thus dry.

According to one exemplary implementation of the invention, the control method comprises the following step:
 if the shutdown time is less than or equal to a predetermined shutdown time, assigning the stored value to the moisture level evaluated on the heat exchanger.

When the vehicle shutdown is not long enough, it is considered that the quantity of water present on the heat exchanger is the same as that evaluated when the vehicle was shut down.

According to one embodiment, the predetermined shutdown time is a constant value.

This solution is simple to implement.

According to another embodiment, the predetermined shutdown time is determined on the basis of the evaluated moisture level stored when the vehicle was switched off.

It is thus possible to modulate the vehicle shutdown time on the basis of which it is considered that all the water present on the heat exchanger when the vehicle was shut down has disappeared while the vehicle was shut down. The higher the evaluated moisture level, the longer the shutdown time on the basis of which it is considered that all the water has evaporated.

The invention also relates to an electronic control unit, configured to implement the control method described above.

The invention also relates to a thermal conditioning circuit for thermally conditioning an air flow, in particular intended for a passenger compartment of a motor vehicle,
the circuit comprising a heat exchanger configured to have a refrigerant pass through it and to exchange heat with the air flow, the heat exchanger being configured to operate selectively in at least:
a mode referred to as cooling mode in which the air flow is cooled,
a mode referred to as heating mode in which the air flow is heated,
the thermal conditioning circuit being configured to:
evaluate a moisture level in a region in contact with an outer surface of the heat exchanger,
detect an instruction to switch from cooling mode to heating mode,
if the evaluated moisture level is below a first predetermined threshold, allow refrigerant to circulate through the heat exchanger in response to the instruction to switch to heating mode,
if the evaluated moisture level is above a second predetermined threshold, prevent the refrigerant from circulating through the heat exchanger for a first predetermined period of time so as to delay the switch to heating mode.

Figure 2:
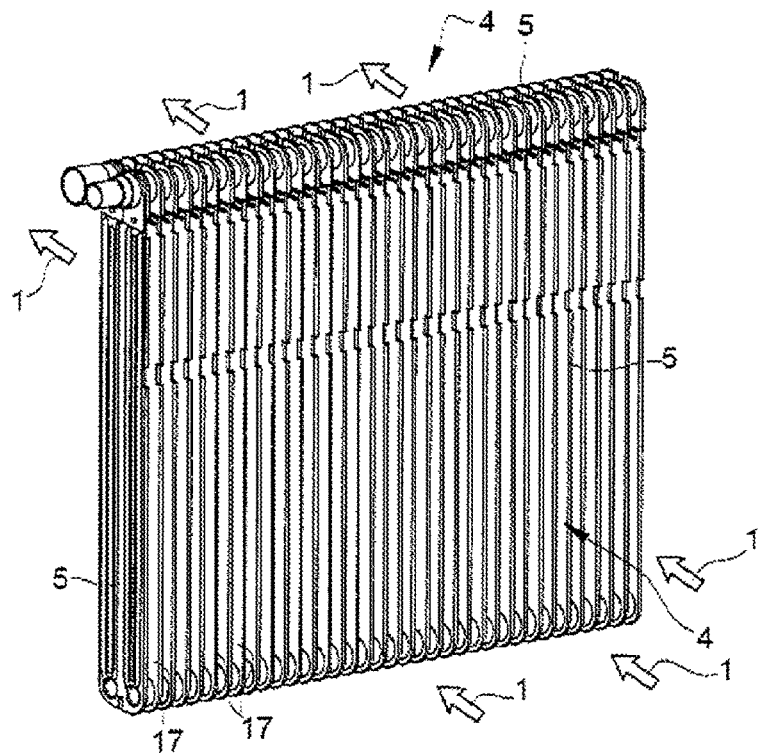
Figure 5:
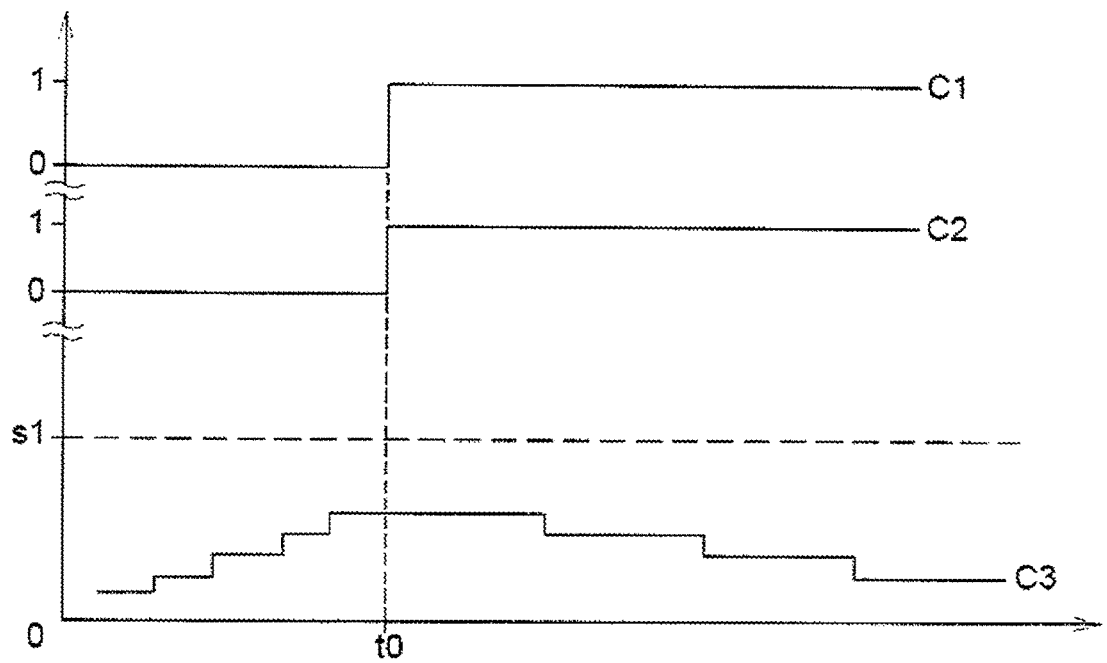
Figure 6:
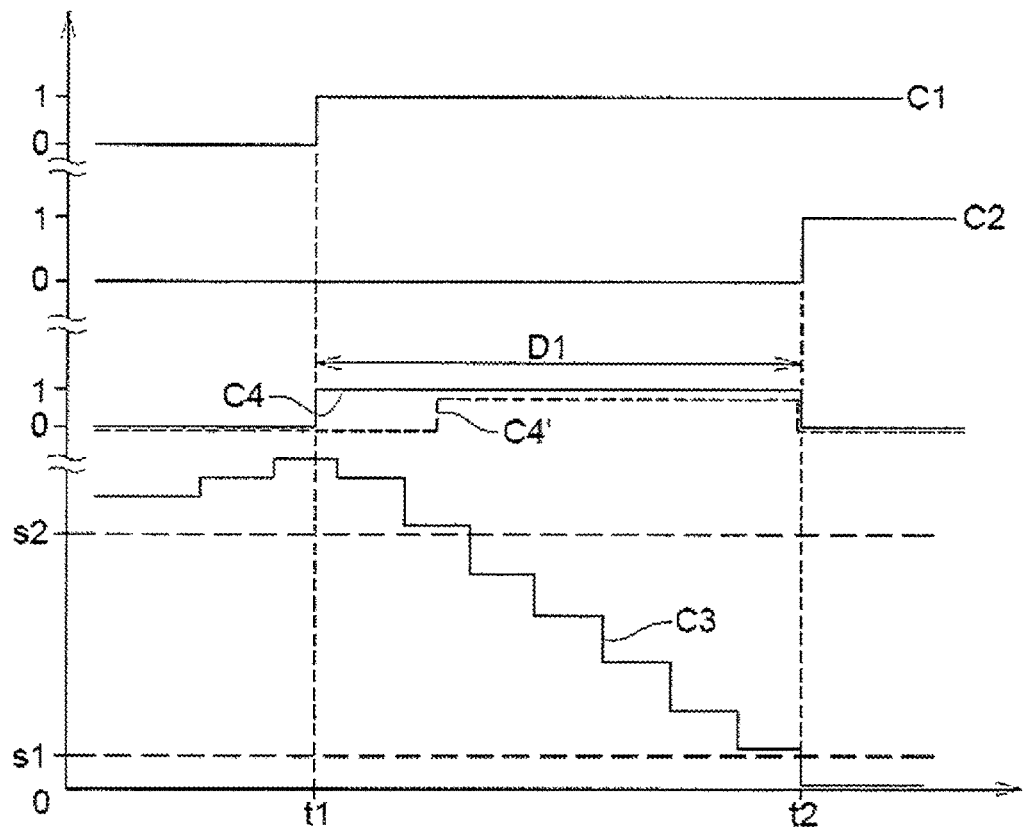
Figure 7:
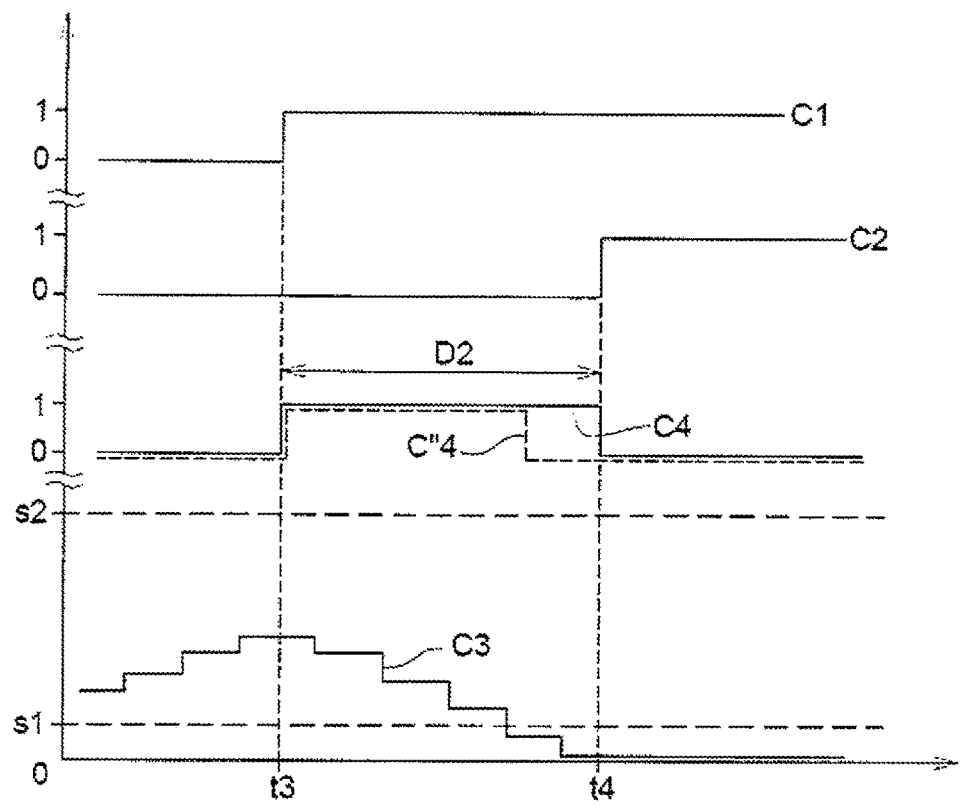
Figure 8:
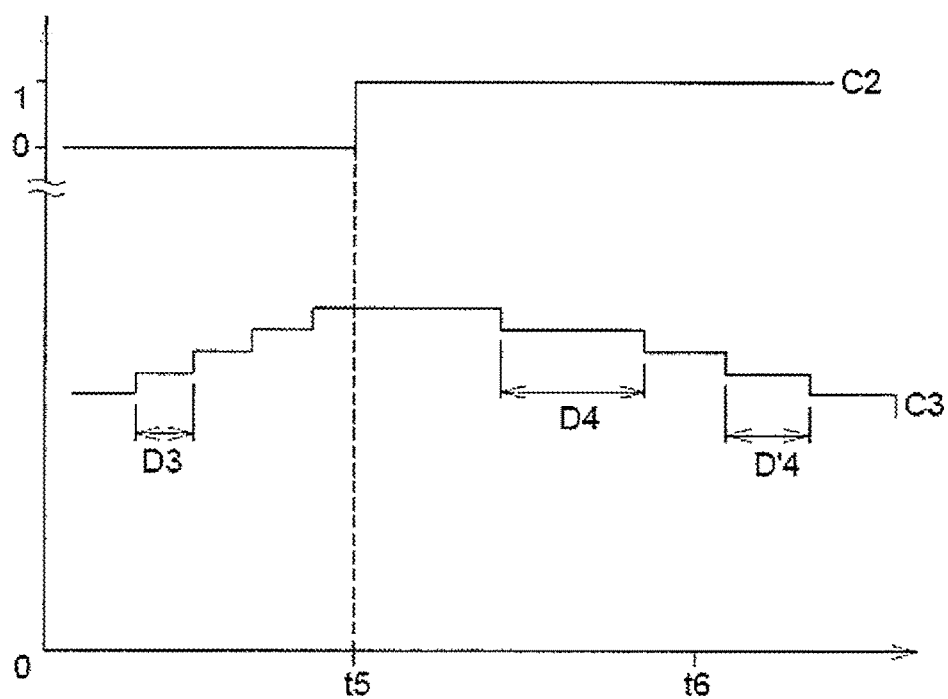
Figure 9:
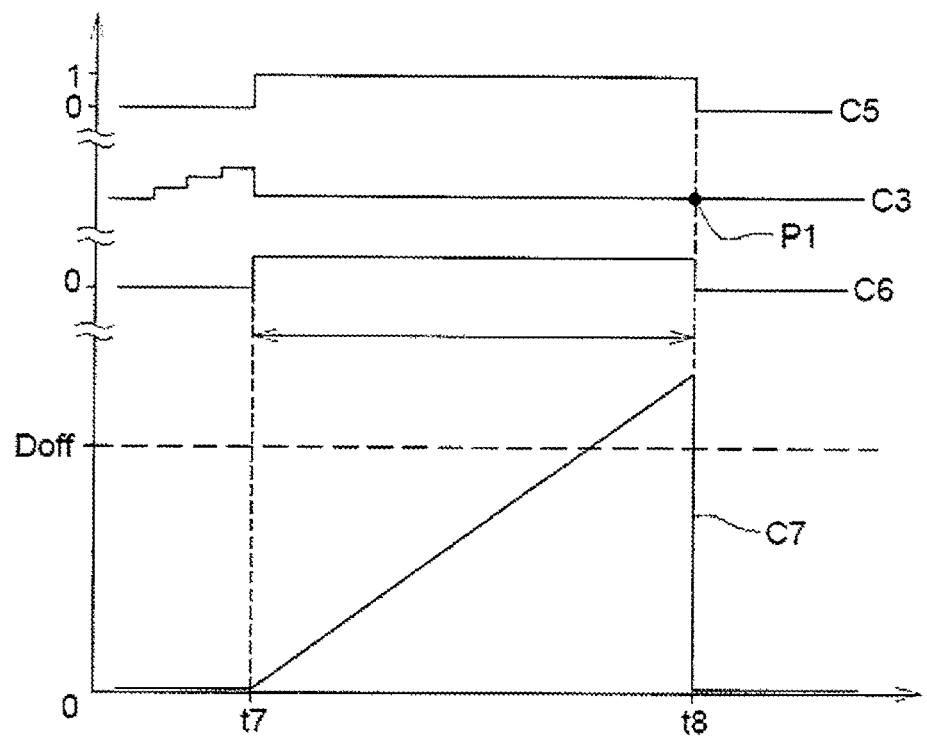
Figure 10:
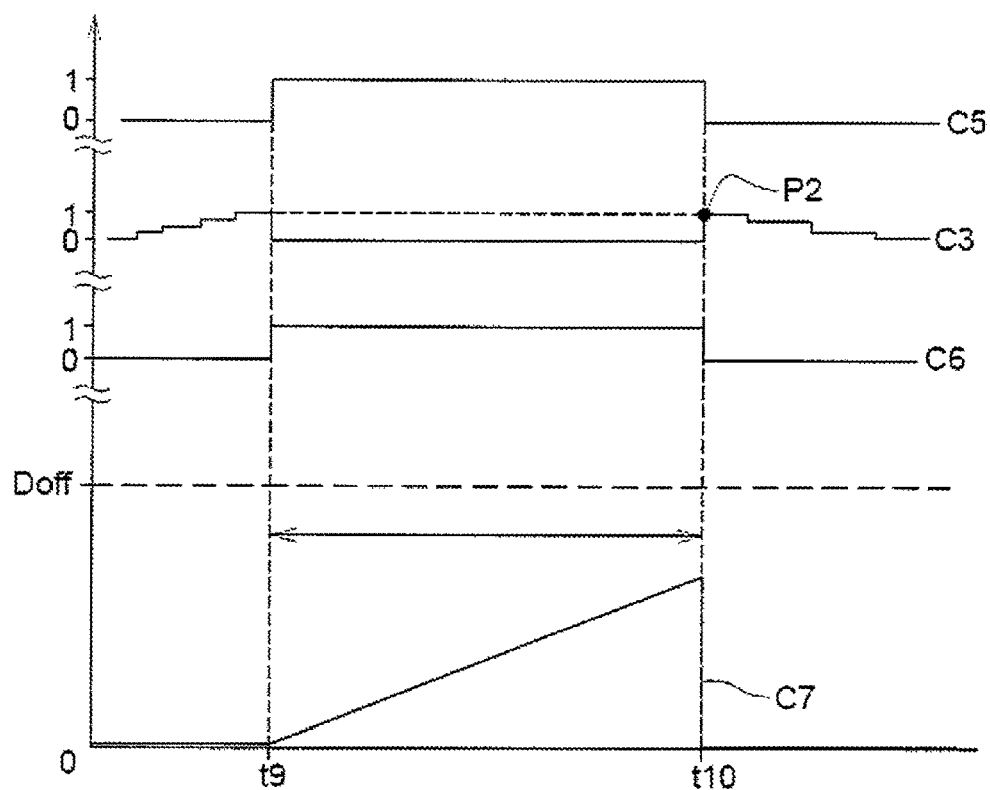

Further features and advantages of the invention will become apparent on reading the detailed description of the embodiments given as non-limiting examples, accompanied by the figures below:

FIG. 1 is a schematic diagram of a thermal conditioning circuit that can implement the method according to the invention, FIG. 2 shows a heat exchanger of the thermal conditioning circuit of FIG. 1, FIG. 3 is a pressure-enthalpy diagram showing an operating mode of the thermal conditioning circuit of FIG. 1, FIG. 4 is a block diagram showing the different steps of the method according to the invention, FIG. 5 shows the evolution over time of various parameters illustrating the different steps of the method according to the invention, FIG. 6 shows the evolution over time of various parameters illustrating the different steps of the method according to the invention, FIG. 7 shows the evolution over time of various parameters illustrating the different steps of the method according to the invention, FIG. 8 shows the evolution over time of various parameters illustrating the different steps of the method according to the invention, FIG. 9 shows the evolution over time of various parameters illustrating the different steps of the method according to the invention, FIG. 10 shows the evolution over time of various parameters illustrating the different steps of the method according to the invention, In order to make the figures easier to read, the different elements are not necessarily shown to scale. In these figures, identical elements bear the same reference numerals.

Some elements or parameters may be indexed, in other words designated for example first element or second element, or first parameter and second parameter, etc. The purpose of this indexing is to differentiate between elements or parameters that are similar but distinct. This indexing does not imply any priority of one element or parameter over another and the names can be interchanged. In the description below, the term "upstream" means that one element comes before another with respect to the direction of flow of a fluid. Similarly, the term "downstream" means that one element comes after another with respect to the direction of flow of the fluid.

FIG. 1 shows a thermal conditioning circuit 100 for thermally conditioning an air flow 1. This air flow 1 is intended to supply air to a passenger compartment 2 of a motor vehicle. The thermal conditioning circuit 100 makes it possible to regulate the temperature and the humidity of the air inside the passenger compartment 2 of the vehicle, and thus ensures the thermal comfort of the passengers.

In the example shown in FIG. 1, the thermal conditioning circuit 100 comprises a refrigerant circuit 20 and a heat transfer fluid circuit 21. A two-fluid exchanger 22 ensures thermal coupling between the two circuits 20 and 21. In other words, the refrigerant and the heat transfer fluid can perform heat exchange in the two-fluid exchanger 22. The heat transfer fluid is a heat transfer liquid, for example a mixture comprising water and glycol. The refrigerant in the refrigerant loop is in this case a chemical fluid such as R134a, R1234yf.

The thermal conditioning circuit 100 offers several operating modes. Some of the possible operating modes are heating mode, dehumidification mode and cooling mode.

The thermal conditioning circuit 100 comprises a compression device 6 configured to increase the pressure of the refrigerant. In the example described, the compression device 6 is an electrically driven compressor.

Downstream of the outlet of the compression device 6, the refrigerant circuit 20 comprises, in the order of flow of the refrigerant: the two-fluid exchanger 22, a first expansion device 23, a heat exchanger 4, a second expansion device 24, a second heat exchanger 25, a refrigerant storage device 26 and the inlet of the compression device 6.

The circuit 100 comprises a heat exchanger 4 configured to have a refrigerant pass through it and to exchange heat with the air flow 1, the heat exchanger 4 being configured to operate selectively in at least:
a mode referred to as cooling mode in which the air flow 1 is cooled,
a mode referred to as heating mode in which the air flow 1 is heated.

The thermal conditioning circuit 100 is configured to:
evaluate a moisture level in a region in contact with an outer surface 5 of the heat exchanger 4,
detect an instruction to switch from cooling mode to heating mode, if the evaluated moisture level H is below a first predetermined threshold s1, allow refrigerant to circulate through the heat exchanger 4 in response to the instruction to switch to heating mode, if the evaluated moisture level H is above a second predetermined threshold s2, prevent the refrigerant from circulating through the heat exchanger 4 for a first predetermined period of time D1 so as to delay the switch to heating mode.

The second heat exchanger 25 is configured to exchange heat with an external air flow 30.

The thermal conditioning circuit 100 further comprises several sensors for measuring the pressure of the refrigerant and the temperature of the refrigerant. The temperature of the air flow 1 downstream of the heat exchanger 4 is measured by a temperature sensor 14. In other words, the sensor 14 is arranged downstream of the exchanger 14. The ambient temperature is measured by a temperature sensor 12. The ambient humidity level is measured by a humidity sensor 13.

An electronic control unit 16 receives the information from the various sensors. The electronic unit 16 also receives the instructions input by the occupants of the vehicle, such as the desired temperature inside the passenger compartment. The electronic unit 16 implements the control laws for controlling the various actuators, in order to control the thermal conditioning circuit 100. In order to simplify the figure, only a few electrical connections between the control unit 16 and the various sensors and actuators have been shown.

In particular, the electronic control unit 16 is configured to implement the control method according to the invention.

The heat transfer fluid circuit 20 comprises a heat exchanger 9 capable of exchanging heat with the air flow 1. The heat exchanger 9 is arranged, according to the direction of flow of the air flow 1, downstream of the heat exchanger 4. In other words, the air flow 1 first passes through the heat exchanger 4 before passing through the heat exchanger 9. These two heat exchangers are arranged in the heating, ventilation and air conditioning system within the passenger compartment 2 of the vehicle.

The heat transfer fluid circuit 21 also includes a heat exchanger 28 capable of exchanging heat with an air flow 30 outside the passenger compartment. This heat exchanger 28 may be arranged at the front end of the vehicle, behind the openings in the grille which allow the external air flow 30 to pass through to the exchanger 28.

There is a pump 27 for circulating the heat transfer fluid through the heat transfer fluid circuit 21.

The operation of the thermal conditioning circuit 100 in passenger compartment heating mode is shown in FIG. 3. The diagram of FIG. 3 shows, in the pressure-enthalpy plane, the thermodynamic cycle followed by the refrigerant. Curve S is the refrigerant saturation curve.

In heating mode, the refrigerant is first compressed by the compressor 6 to a pressure P2 referred to as high pressure. Point A schematically shows the state of the refrigerant entering the compressor 6 and point B schematically shows the state of the fluid leaving the compressor 6. The refrigerant then passes into the two-fluid exchanger 22, and transfers heat to the heat transfer fluid. The quantity of heat transferred is given by the enthalpy difference between point B and point C. Point C schematically shows the state of the refrigerant leaving the two-fluid exchanger 22. The refrigerant is then partially expanded in the first expansion device 23, to a pressure P1 referred to as intermediate pressure. The refrigerant then passes through the heat exchanger 4 and transfers heat to the air flow 1, thus heating the passenger compartment 2. The amount of heat supplied to the air flow 1 is given by the enthalpy difference between point D, the inlet of the exchanger 4, and point E, the outlet of the exchanger 4. The refrigerant is then expanded to a pressure P0 referred to as low pressure, in the second expansion device 24. The low-pressure refrigerant then passes through the heat exchanger 25, located for example at the front end of the vehicle, and receives heat there from the external air flow 30, which causes the refrigerant to evaporate. Point F shows the state of the refrigerant entering the exchanger 25. The vaporized refrigerant returns to the compressor 6 and completes the thermodynamic cycle.

In this heating mode, the air flow 1 is heated on the one hand by the heat exchanger 9, through which the heat transfer fluid circulates, and on the other hand by the heat exchanger 4, through which the refrigerant circulates, at intermediate pressure. This method is described in detail in patent EP 2933586 B1. In this operating mode, most of the energy for heating the passenger compartment is supplied by the air outside the vehicle, which supplies the heat necessary to vaporize the refrigerant at low pressure, i.e. the segment between points F and A in FIG. 3. This heating method is therefore particularly advantageous for heating the passenger compartment of an electric vehicle since it makes it possible to minimize the electrical power required for heating the vehicle.

The thermal conditioning circuit 100 may also operate in passenger compartment 2 cooling mode.

In this mode, the compressed refrigerant passes into the two-fluid exchanger 22. The refrigerant transfers heat to the heat transfer fluid. The refrigerant is then expanded in the first expansion device 23 before passing through the heat exchanger 4. The refrigerant absorbs heat from the air flow 1, thus cooling the passenger compartment 2. The refrigerant then passes through the heat exchanger 25 located at the front end and returns to the compressor 6. The heat transfer fluid is in turn cooled in the cooling exchanger 28 located at the front end.

As the air flow 1 cools, the moisture in the air tends to condense. To be specific, the temperature of the walls of the exchanger 4, with which the air flow 1 exchanges heat, may be lower than the dew point of the air flow 1. In other words, when the heat exchanger 4 cools the air flow 1, water droplets are formed and gradually accumulate on the outer surface 5 of the walls of the exchanger 4 as well as in the vicinity of the walls. Since the layer of condensed water on the outside of the exchanger 4 may have a non-zero thickness, there is considered to be a region in contact with the outer surface of the exchanger 4, in which water in liquid form can be found. FIG. 2 details an example of the heat exchanger 4. The exchanger 4 comprises a series of fins 17 between which the air flow 1 can pass and thus exchange heat with the refrigerant flowing through the exchanger 4. The air flow 1 flows in a direction substantially perpendicular to the plane of the exchanger 4.

If the thermal conditioning circuit 100 switches to heating mode while water in liquid form is present in the region in contact with the outer surface 5 of the heat exchanger 4, this water tends to vaporize and to be taken up by the air flow 1 intended for the passenger compartment 2. If the windows of the vehicle are cold, the water vapor taken up by the air flow 1 will condense and mist them up. When there is a large amount of water on the exchanger 4, this mist can seriously impair visibility and become a driving hazard. This situation must therefore be avoided. To this end, the present invention proposes a particular management of the transitions between the operating modes in order to avoid misting, in particular on the windshield.

To this end, the proposed method evaluates the moisture level of the heat exchanger 4 and allows the switch to heating mode of this exchanger only if this moisture level is sufficiently low. If the evaluated moisture level is considered too high, the switch to heating mode is delayed. Additional heating may be used during this period when heating mode is not activated, in order to still heat the air flow 1.

The moisture level of the exchanger 4 is estimated continuously as a function of the operating conditions of the exchanger 4. When the exchanger 4 is operating in cooling mode, the moisture level increases. When the exchanger 4 is operating in heating mode, the moisture level decreases. Depending on the sensors available, various parameters can be taken into account to estimate the variations in moisture level. In the simplest modeling, only the duration of operation in each of the operating modes is taken into account. It is also possible to take into account the temperature of the ambient air, as well as its humidity. Moreover, it is also possible to take into account the flow rate of air in contact with the heat exchanger 4, as well as the temperature of the air blown by the exchanger 4. The evaluated moisture level is stored when the vehicle is switched off. When the vehicle is started up again, the period of time for which the vehicle was switched off is calculated. If this period is long enough, the method considers that the moisture present on the exchanger 4 has had time to evaporate and that the exchanger 4 is dry. The moisture level value stored is then not taken into account. If the shutdown lasts for less than this time limit, the method considers that water is still present on the exchanger 4 and uses the moisture level value stored to manage the activation of the heating mode.

The invention thus proposes a control method for controlling a thermal conditioning circuit 100 for thermally conditioning an air flow 1, in particular intended for a passenger compartment 2 of a motor vehicle,
the circuit comprising a heat exchanger 4 configured to have a refrigerant pass through it and to exchange heat with the air flow 1, the heat exchanger 4 being configured to operate selectively in at least:
a mode referred to as cooling mode in which the air flow 1 is cooled,
a mode referred to as heating mode in which the air flow 1 is heated,
the method comprising the following steps:
evaluating a moisture level H in a region in contact with an outer surface 5 of the heat exchanger 4, (step 60)
detecting an instruction to switch from cooling mode to heating mode, (step 61)
if the evaluated moisture level H is below a first predetermined threshold s1, allowing refrigerant to circulate through the heat exchanger 4 in response to the instruction to switch to heating mode, (step 62)
if the evaluated moisture level H is above a second predetermined threshold s2, prevent the refrigerant from circulating through the heat exchanger 4 for a first predetermined period of time D1 so as to delay the switch to heating mode. (step 63)

This step is shown in FIG. 5. Curve C1 shows the evolution over time of the operating mode instruction. Level 1 indicates an instruction for operation in heating mode, level 0 indicates an instruction for operation in cooling mode. Curve C2 shows the evolution over time of the authorization to switch to heating mode of the exchanger 4. Level 1 indicates that the heating mode of the exchanger 4 is authorized. Curve C3 shows the evolution of the moisture level H of the exchanger 4. In FIGS. 5 to 10, the double wave symbol on the y-axis indicates that the different curves have distinct origins, in order to space apart the curves to improve readability.

When the moisture level H evaluated on the heat exchanger 4 is low enough to avoid the risk of misting, switching of the heat exchanger to heating mode is authorized upon receipt of the instruction. This is the case in FIG. 5: the evaluated moisture level H is below the threshold s1, the switch to heating mode is therefore authorized from the instant t0 corresponding to receipt of the instruction. In other words, the switch to heating mode is carried out in response to the instruction to switch to heating mode.

If the evaluated moisture level H is too high, i.e. the region in contact with the outer surface 5 of the heat exchanger 4 contains too much water, the switch to heating mode is delayed with respect to receipt of the instruction to switch to heating mode. In other words, the instruction to switch to heating mode is not applied immediately, but after a time delay. The delay thus introduced can be used to reduce the moisture level of the heat exchanger and achieve conditions in which switching to heating mode will not pose a problem.

This case is shown in FIG. 6. Curves C1, C2, C3 illustrate the same parameters as in FIG. 5, at a different time. In this figure, the evaluated moisture level H is above the threshold s2 when the instruction to switch to heating mode is received. The actual switch to heating mode takes place at instant t2, i.e. with a delay of duration D1 with respect to receipt of the instruction to switch to heating mode, which occurs at instant t1.

According to one embodiment, the control method comprises the following step:
if the evaluated moisture level H is between the first predetermined threshold s1 and the second predetermined threshold s2, preventing the refrigerant from passing into the heat exchanger 4 for a second predetermined period of time D2 so as to delay the switch to heating mode. (step 64)

This step is shown in FIG. 7. When the estimated moisture level is between the two predetermined thresholds s1 and s2, the switch to heating mode is delayed by a period of time D2, which is shorter than the period of time D1. The instruction to switch to heating mode is in this case received at instant t3, and the switch to heating mode takes place at instant t4.

According to one embodiment, circulation of the refrigerant through the heat exchanger 4 is prevented by keeping the compression device 6 shut down. "Shut down" means that the electric motor driving the mechanical components for compressing the refrigerant is not on, i.e. it is not receiving electrical power. The compression device 6 does not increase the pressure in the refrigerant circuit 20, and it is considered that there is thus no circulation of refrigerant through the heat exchanger.

According to another embodiment, circulation of the refrigerant through the heat exchanger 4 is prevented by opening a bypass line 7 allowing the refrigerant to bypass the heat exchanger 4.

In this case, the refrigerant may circulate through the refrigerant circuit 20, except through the exchanger 4. The refrigerant thus passes into the bypass line 7 rather than the heat exchanger 4. The bypass line 7 includes a shut-off valve 8 configured to prevent the circulation of fluid through the bypass line 7.

When maximum cooling power is required, the shut-off valve 8 prevents the refrigerant from bypassing the heat exchanger 4, which forces all of the refrigerant to pass through the exchanger 4. The bypass line 7 and the shut-off valve 8 are shown in FIG. 1.

According to one exemplary implementation of the method, the first predetermined period D1 of prevention of circulation of the refrigerant through the heat exchanger 4 is between 8 and 12 minutes. The first predetermined period D1 is preferably between 9 and 11 minutes.

These ranges of values ensure mist-free operation when the heat exchanger switches to heating mode when a high moisture level has been evaluated.

According to one exemplary implementation of the method, the second predetermined period D2 of prevention of circulation of the refrigerant through the heat exchanger 4 is between 3 and 5 minutes. The second predetermined period D2 is preferably equal to 4 minutes.

As above, these ranges of values ensure mist-free operation when the heat exchanger switches to heating mode when an intermediate moisture level has been evaluated. The values may be adapted to the vehicle in which the method is implemented.

According to one possible implementation of the method, the moisture level H evaluated on the heat exchanger 4 is evaluated on a discrete scale comprising two levels. A two-level scale makes it possible to differentiate between a "dry" state and a "wet" state of the heat exchanger. This solution is simple to implement because it requires little memory and computing power from the electronic control unit 16.

According to another possible implementation of the method, the moisture level H evaluated on the heat exchanger 4 is evaluated on a discrete scale comprising three levels. This three-level scale makes it possible to take into account a "dry" state of the heat exchanger 4, a "partially wet" state and a "completely wet" state of the heat exchanger 4.

According to another alternative implementation of the method, the moisture level H evaluated on the heat exchanger 4 is evaluated on a discrete scale comprising N levels, N being an integer strictly greater than 3. An N-level scale, with N strictly greater than three, makes it possible to differentiate between a "dry" state, a "completely wet" state and several "partially wet" states defining increasing moisture levels of the heat exchanger. Such an alternative can allow finer modeling of the phenomena of condensation and evaporation of water on the heat exchanger but is more complex to implement. FIGS. 5 to 9 correspond to this type of scale, making it easier to see the evolution of the evaluated moisture level over time.

Additional heating 10 may be used during the phase in which heating by the exchanger 4 is not authorized, in order to still heat the air flow 1.

To this end, the circuit includes an additional heating device 10 configured to heat the air flow 1, the method comprising the following step:
  during the step of preventing the refrigerant from passing into the heat exchanger 4, activating the additional heating device 10 in order to heat the air flow 1. (step 65)

The additional heating device 10 may be activated instead of heating by the exchanger 4, and ensures the desired heating power.

The additional heating device 10 is arranged, according to the direction of circulation of the air flow 1, downstream of the heat exchanger 4.

This arrangement prevents the air flow intended for the passenger compartment of the vehicle from picking up the moisture contained on the surface of the heat exchanger.

In the example of FIG. 1, the additional heating device 10 comprises an electrical resistor 11 configured to heat a heat transfer fluid circulating through a heat exchanger exchanging heat with the air flow 1.

The heat supplied to the heat transfer fluid by the electrical resistor 11 is added to the heat supplied to the heat transfer fluid in the two-fluid exchanger 22 by the high pressure refrigerant. Although the exchanger 4 is then not used in heating mode, the overall heating power can be ensured. The method according to the invention makes it possible to minimize the operating phases during which the additional heating 10 is used. To be specific, in the absence of modeling of the moisture level of the region close to the surface of the exchanger 4, all switches to heating mode should be carried out using only the additional heating 10 to avoid the risk of misting on the windshield of the vehicle.

According to one exemplary implementation of the method, the additional heating device 10 is activated for the whole duration of the step of preventing the refrigerant from passing into the heat exchanger 4. This is the case illustrated by curve C4 in FIGS. 6 and 7. When curve C4 is in state 0, additional heating 10 is not activated. When curve C4 is in state 1, additional heating 10 is activated.

According to another exemplary implementation of the method, the additional heating device 10 is activated for some of the duration of the step of preventing the refrigerant from passing into the heat exchanger 4. This is the case illustrated by curve C'4 in FIG. 6 and curve C"4 in FIG. 7. On curve C"4, the command for additional heating ceases before the end of the period D2. On curve C'4, the command for additional heating begins after instant t1. It is of course possible to provide other additional heating command modes, such as a command starting after instant t1 and ending before instant t2. Likewise, an intermittent command during the period D1 or D2 is also possible.

The control method may comprise the following step:
  during the step of activating the additional heating device, ensuring a minimum value for the flow rate of the air flow in thermal contact with the heat exchanger.

This minimum air flow rate passing through the heat exchanger makes it possible to dry the latter. The minimum flow rate is chosen so as not to be perceptible by the user when the user has decided not to activate the air conditioning system of the vehicle. The air flow rate is also chosen such that the evaporation is slow enough not to saturate the air passing through the exchanger with moisture, so as to avoid the risk of misting the windows of the vehicle.

The control method may comprise the following step:
  during the step of activating the additional heating device 10, increasing the flow rate of the air flow 1 in thermal contact with the heat exchanger 4.

This step of increasing the flow rate of air in contact with the heat exchanger 4 speeds up the evaporation of water from the surface of the heat exchanger 4. This evaporation is however slow enough that there is no risk of misting, the moisture level in the air exchanging heat with the exchanger 4 remaining below the level causing saturation and the creation of droplets.

The increase in the flow rate of the air flow 1 is obtained by increasing a rotational speed of a motor-fan unit 18. The motor-fan unit 18 is, in a well-known manner, arranged in the heating, ventilation and air conditioning system and helps channel the air flow 1 to the passenger compartment 2.

The steps of the method for continuously estimating the moisture level of the heat exchanger 4 will now be described in detail. The operating phases leading to condensation of the water vapor on the exchanger are differentiated from the operating phases leading to evaporation of the water already present on the exchanger 4.

To this end, the control method comprises the following step:
  determining a period of time for which the heat exchanger 4 operates in cooling mode,
  if the operating time in cooling mode is greater than a third predetermined period of time D3, incrementing the moisture level H evaluated on the heat exchanger 4. (step 66)

Incrementation consists in increasing the evaluated moisture level H by 1, on the evaluation scale used.

The heat exchanger "cooling" mode may correspond to several different operating modes of the thermal conditioning circuit 100. To be specific, the vehicle passenger compartment air "conditioning" mode and "dehumidification" mode both cause the heat exchanger 4 to operate in "cooling" mode. In dehumidification mode, the exchanger 4 cools the air flow 1, before it is heated again by the exchanger 9. Thus, cooling in the exchanger 4 is possible even when an overall increase in the temperature of the air flow 1 is obtained.

According to one exemplary implementation of the method, the third predetermined period of time D3 after which the moisture level H evaluated on the heat exchanger 4 is incremented is a constant value. This value is stored in a permanent memory of the control unit 16.

According to another exemplary implementation of the method, the third predetermined period of time D3 after which the moisture level H evaluated on the heat exchanger 4 is incremented is determined on the basis of a value of a flow rate of air in contact with the heat exchanger 4. The air flow rate may for example be estimated from a value of the rotational speed of the motor-fan unit 18, which can be measured or even estimated from the instructions from the driver.

As an alternative or in addition, the third predetermined period of time D3 after which the moisture level H evaluated on the heat exchanger 4 is incremented is determined on the basis of a value of the ambient temperature.

As an alternative or in addition, the third predetermined period of time D3 after which the moisture level H evaluated on the heat exchanger 4 is incremented is determined on the basis of an ambient humidity level.

As an alternative or in addition, the third predetermined period of time D3 after which the moisture level H evaluated on the heat exchanger 4 is incremented is determined on the basis of a value of the temperature of the air flow 1 downstream of the heat exchanger 4.

The physical parameters listed above are all involved in the phenomenon of condensation of the water vapor present in the air exchanging heat with the exchanger 4. Taking these parameters into account improves the accuracy of the modeling. The method may use only some of these parameters when, for cost reasons, certain sensors are not present.

A similar principle is applied to estimate the evaporation of the liquid water present in the region close to the surface of the exchanger 4, which decreases the moisture level of the exchanger 4.

To this end, the control method comprises the following step:
  determining a period of time for which the heat exchanger 4 operates in a mode other than cooling mode,
  if the operating time in a mode other than cooling mode is greater than a fourth predetermined period of time D4, decrementing the moisture level H evaluated on the heat exchanger 4. (step 67)

The proposed decrementation consists in decreasing the evaluated moisture level H by 1, on the evaluation scale used.

A mode other than "cooling" mode means "heating" mode or "inactive" mode. In "heating" mode, the heat exchanger exchanges heat with the air in contact with its surface so as to heat the air. In "inactive" mode, the exchanger does not exchange heat with the air in contact with its surface. This mode can for example be triggered by the driver of the vehicle when he does not wish to use the vehicle's air conditioning circuit.

As an alternative or in addition, the fourth predetermined period of time D4 after which the moisture level H evaluated on the heat exchanger 4 is decremented is determined on the basis of a value of a flow rate of air in contact with the heat exchanger 4.

As an alternative or in addition, the fourth predetermined period of time D4 after which the moisture level H evaluated on the heat exchanger 4 is decremented is determined on the basis of a value of the ambient temperature.

As an alternative or in addition, the fourth predetermined period of time D4 after which the moisture level H evaluated on the heat exchanger 4 is decremented is determined on the basis of an ambient humidity level.

As an alternative or in addition, the fourth predetermined period of time D4 after which the moisture level H evaluated on the heat exchanger 4 is decremented is determined on the basis of a value of the temperature of the air flow 1 upstream of the heat exchanger 4.

As above, taking into account the various physical values involved in the phenomenon of evaporation of the water droplets present on the surface of the exchanger 4 makes it possible to improve the accuracy of the method.

FIG. 8 shows these operating phases in detail. Until time t5, the exchanger 4 operates in cooling mode. The evaluated moisture level H, curve C5, is therefore incremented after each time interval equal to D3. From instant t5, the exchanger 4 operates in heating mode. The evaluated moisture level H is therefore decremented after each time interval equal to D4. From instant t6, the period of time between two decrementations changes and is equal to D'4.

In this exemplary implementation, the value of the decrement is constant, equal to 1, and the period of time D4 after which the evaluated moisture level H is decremented is variable. It would of course be possible to achieve the same behavior of the method by using a variable decrement and a fixed period of time. The same applies to the step of incrementing the evaluated moisture level H: it is possible to use a variable increment and a fixed period of time D3.

The steps which have just been described make it possible to continuously evaluate the moisture level of the exchanger 4 during the phases of use of the vehicle. Specific steps are provided to take into account the phases during which the vehicle is not in use. These phases correspond to the times when the air conditioning system is not activated and the vehicle is not in motion, such as when it is parked. "Vehicle switched off" means the moment when the electrical consumption of the electronic unit 16 becomes zero. This term means that the electric current consumed by the electronic unit 16 is equal to no more than the leakage current associated with the connection of the electronic unit 16 to an electrical power supply of the vehicle.

Thus, the control method comprises the following step:

when the vehicle is switched off, storing the moisture level H evaluated on the heat exchanger 4.

The control method comprises the following step:
when the vehicle is switched off, writing the moisture level H evaluated on the heat exchanger 4 in a permanent memory 15 of an electronic control unit 16.

The stored value can thus be read again when the vehicle is started up again after a period of inactivity.

The control method comprises the following step:
when the vehicle is started up, determining the evaluated moisture level H stored when the vehicle was switched off.

The control method comprises the following step:
when the vehicle is started up, determining a time for which the vehicle was shut down.

The control method comprises the following step:
if the shutdown time is greater than a predetermined shutdown time Doff, assigning a zero value to the moisture level H evaluated on the heat exchanger 4.

If the shutdown is long enough, it is considered that all the water that was present on the heat exchanger when the vehicle was shut down has had time to evaporate while the vehicle was shut down. The heat exchanger is thus dry.

These steps are shown in FIG. 9. Curve C5 schematically shows the state of operation of the vehicle. Curve C3 schematically shows the evaluated moisture level H. At instant t7, the vehicle enters the switched-off state, which lasts until instant t8. Curve C7 illustrates the duration of the "switched-off" phase. Curve C6 illustrates the value of the moisture level stored. At instant t7, the current value of curve C3 is stored. At instant t8, the vehicle begins to operate again. The duration of the shutdown is greater than the threshold duration Doff, the value with which the moisture level is reset at instant t8 is therefore zero. (Point P1)

The control method comprises the following step:
if the shutdown time is less than or equal to a predetermined shutdown time Doff, assigning the stored value to the moisture level H evaluated on the heat exchanger 4.

When the vehicle shutdown is not long enough, it is considered that the quantity of water present on the heat exchanger is the same as that evaluated when the vehicle was shut down.

This case is shown in FIG. 10. Curve C5 schematically shows the state of operation of the vehicle. Curve C3 schematically shows the evaluated moisture level H. At instant t9, the vehicle enters the switched-off state, which lasts until instant t10. Curve C7 illustrates the duration of the "switched-off" phase. Curve C6 illustrates the value of the moisture level stored. At instant t9, the current value of curve C5 is stored. At instant t10, the vehicle begins to operate again. The duration of the shutdown is less than the threshold duration Doff, the value with which the moisture level is reset is therefore the value which was stored when the vehicle was switched off. (Point P2)

According to one embodiment, the predetermined shutdown time Doff is a constant value.

According to another embodiment, the predetermined shutdown time Doff is determined on the basis of the evaluated moisture level H stored when the vehicle was switched off.

It is thus possible to modulate the vehicle shutdown time on the basis of which it is considered that all the water present on the heat exchanger when the vehicle was shut down has disappeared while the vehicle was shut down. The higher the evaluated moisture level, the longer the shutdown time on the basis of which it is considered that all the water has evaporated.

The thermal conditioning circuit 100 is configured to implement all the steps and features of the method described above.

According to embodiments not shown, the control method, as well as the thermal conditioning circuit implementing the method, may also include one or more of the following features, considered individually or in combination with one another:
the additional heating device 10 may include an electrical resistor configured to exchange heat with the air flow 1.

In this case, the electrical resistor heating the heat transfer fluid is not present. An electrical resistor that directly heats the air flow 1, rather than the heat transfer fluid, ensures high thermal power and has low thermal inertia.
the additional heating device 10 may include a burner configured to burn fuel.

Of course, other modifications and variations are apparent to a person skilled in the art following examination of the different embodiments illustrated. The invention is in no way limited to the embodiments described and illustrated in this application, which are given by way of example and are not intended to limit the scope of the invention.

In particular, the general principle described herein could also be applied in an architecture where the air is heated without a heat transfer fluid circuit but directly with an internal condenser. The refrigerant then exchanges heat directly with the air flow intended for the passenger compartment.

The invention claimed is:

1. A control method for controlling a thermal conditioning circuit for thermally conditioning an air flow for a passenger compartment of a motor vehicle, the thermal conditioning circuit comprising a heat exchanger configured to have a refrigerant pass through it and to exchange heat with the air flow, the heat exchanger being configured to operate selectively in at least:
    a cooling mode in which the air flow is cooled,
    a heating mode in which the air flow is heated,
    the control method comprising:
        evaluating a moisture level in a region in contact with an outer surface of the heat exchanger;
        detecting an instruction to switch from the cooling mode to the heating mode;
        allowing the refrigerant to circulate through the heat exchanger in response to the instruction to switch to the heating mode, wherein the evaluated moisture level is below a first predetermined threshold; and
        preventing the refrigerant from circulating through the heat exchanger for a first predetermined period of time so as to delay the switch to the heating mode, wherein the evaluated moisture level is above a second predetermined threshold,
        wherein the second predetermined threshold is greater than the first predetermined threshold;
    wherein the thermal conditioning circuit comprises an additional heater configured to heat the air flow, and
    wherein preventing the refrigerant from circulating through the heat exchanger for the first predetermined period of time further comprises activating the additional heater to heat the air flow.

2. The control method as claimed in claim 1, further comprising:

preventing the refrigerant from circulating through the heat exchanger for a second predetermined period of time so as to delay the switch to the heating mode, wherein the evaluated moisture level is between the first predetermined threshold and the second predetermined threshold, wherein preventing the refrigerant from circulating through the heat exchanger for the second predetermined period of time further comprises activating the additional heater to heat the air flow.

3. The control method as claimed in claim 1, wherein the thermal conditioning circuit comprises a compressor configured to increase a pressure of the refrigerant, and wherein circulation of the refrigerant through the heat exchanger is prevented by keeping the compressor shut down.

4. The control method as claimed in claim 1, wherein circulation of the refrigerant through the heat exchanger is prevented by opening a bypass line allowing the refrigerant to bypass the heat exchanger.

5. The control method as claimed in claim 1,
wherein activating the additional heater further comprises ensuring a minimum value for a flow rate of the air flow in thermal contact with the heat exchanger.

6. The control method as claimed in claim 1, further comprising:
determining a period of time for which the heat exchanger operates in the cooling mode; and
incrementing the moisture level evaluated on the heat exchanger, wherein the operating time in the cooling mode is greater than a third predetermined period of time.

7. The control method as claimed in claim 1, further comprising:
determining a period of time for which the heat exchanger operates in a mode other than the cooling mode; and
decrementing the moisture level evaluated on the heat exchanger, wherein the operating time in a mode other than the cooling mode is greater than a fourth predetermined period of time.

8. The control method as claimed in claim 1, further comprising:
storing the moisture level evaluated on the heat exchanger, wherein the motor vehicle is switched off,
determining the evaluated moisture level stored when the motor vehicle was switched off, wherein the motor vehicle is started up,
determining a shutdown time for which the motor vehicle was shut down, wherein the motor vehicle is started up,
assigning a zero value to the moisture level evaluated on the heat exchanger, wherein the shutdown time is greater than a predetermined shutdown time, and
assigning the stored value to the moisture level evaluated on the heat exchanger, wherein the shutdown time is less than or equal to the predetermined shutdown time.

9. A control method for controlling a thermal conditioning circuit for thermally conditioning an air flow for a passenger compartment of a motor vehicle, the thermal conditioning circuit comprising a heat exchanger configured to have a refrigerant pass through it and to exchange heat with the air flow, the heat exchanger being configured to operate selectively in at least:
a cooling mode in which the air flow is cooled,
a heating mode in which the air flow is heated,
the control method comprising:
evaluating a moisture level in a region in contact with an outer surface of the heat exchanger;
detecting an instruction to switch from the cooling mode to the heating mode;
allowing the refrigerant to circulate through the heat exchanger in response to the instruction to switch to the heating mode, wherein the evaluated moisture level is below a first predetermined threshold;
preventing the refrigerant from circulating through the heat exchanger for a first predetermined period of time so as to delay the switch to the heating mode, wherein the evaluated moisture level is above a second predetermined threshold,
wherein the second predetermined threshold is greater than the first predetermined threshold; and
preventing the refrigerant from circulating through the heat exchanger for a second predetermined period of time so as to delay the switch to the heating mode, wherein the evaluated moisture level is between the first predetermined threshold and the second predetermined threshold.

\* \* \* \* \*